United States Patent Office 3,258,400
Patented June 28, 1966

3,258,400
ISOPROPYL AND DIISOPROPYL-3,4-DIHYDRO-COUMARINS IN PERFUME COMPOSITIONS
William J. Houlihan, Mountain Lakes, N.J., assignor to Universal Oil Products Company, Des Plaines, Ill., a corporation of Delaware
No Drawing. Filed Aug. 9, 1965, Ser. No. 478,470
3 Claims. (Cl. 167—94)

This invention relates to a novel compound, 5,7-diisopropyl-3,4-dihydrocoumarin, and to perfume compositions containing such compound as an olfactory and fixative ingredient.

Polyalkylated dihydrocoumarins are known compounds and certain of this class are reported to have odors valuable in perfumery. It has now been discovered, however, that of this general class of compounds, the specific compound, 5,7 - diisopropyl - 3,4 - dihydrocoumarin, possesses unique order and fixative properties similar to the highly valuable, naturally occurring macrocyclic musks such as muskone or civitone which renders such compound extremely valuable in perfumery.

Accordingly, an object of this invention is to provide a new compound, 5,7-diisopropyl-3,4-dihydrocoumarin. Another object of this invention is to provide novel perfume compositions containing as an olfactory and musk-like, fixative ingredient, 5,7,-diisopropyl-3,4-dihydrocoumarin. Other objects of this invention will become apparent from the following further-detailed description thereof.

The novel compound of this invention, 5,7-diisopropyl-3,4-dihydrocoumarin, has the following structure:

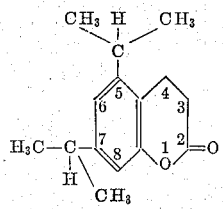

This compound may be prepared according to the general procedure described in United States Patent No. 3,144,467 by alkylating 3,4-dihydrocoumarin with isopropyl alcohol in the presence of an acid catalyst such as relatively anhydrous sulfuric or polyphosphoric acids. The alkylation is usually effected with stoichiometric quantities of reactants at a temperature in the range of from about 0° to about 80° C. under atmospheric pressures. In preparing 5,7-diisopropyl-3,4-dihydrocoumarin by alkylation of 3,4-dihydrocoumarin, the alkylation product obtained frequently also contained in admixture with the 5,7-diisopropyl compound small amounts of the 6,8-diisopropyl isomer as well as mono substituted isopropyl dihydrocoumarins such as 6 or 8 isopropyl-3,4-dihydrocoumarins. These other isopropyl isomers may, if desired, be separated from the 5,7-diisopropyl-3,4-dihydrocoumarin prior to its use in perfumery. However, since the other isopropyl isomers do not detract from the remarkable odor and fixative properties of the 5,7-diisopropyl-3,4-dihydrocoumarin, small quantities of these isomers may be present in admixture with the 5,7-diisopropyl compound without substantially lowering its perfumery value.

The novel compound, 5,7-diisopropyl-3,4-dihydrocoumarin, of this invention has a powerful long-lasting musk odor and a highly effective fixative property which renders the compound of great value in giving perfumes increased lasting quality, and pleasantly sweetened and richly enhanced fragrance. As used herein, the term perfume means a mixture of organic compounds, including, for example, alcohols, aldehydes, ketones, esters, and frequently also hydrocarbons which are combined in fixed proportions so that the odors of the individual compounds combine to produce a hormonious fragrance.

The quantity of the novel compound of this invention utilized in perfumes may vary within a wide range and depends upon the particular type of perfume to be prepared or improved. For example, in a floral type perfume, the quantity used may range from about 0.1 to 80 percent of the total weight of the perfume with a quantity ranging from about 5 to 20 percent being preferred.

The perfume containing the 5,7-diisopropyl-3,4-dihydrocoumarin compound of this invention as an olfactory and fixative ingredient may be used per se or incorporated into materials such as cosmetic creams, soaps, synthetic detergents, talculm powders or other toilet goods such as shampoos to produce products having desirable fragrance properties of long-lasting quality.

The following examples are given to illustrate the compound of this invention and perfumes containing the compound as an olfactory and fixative ingredient:

Example I

About 960 grams of concentrated sulfuric acid were added to an alkylation flask provided with stirring means and immersed in an ice bath. The acid was stirred and cooled to an internal temperature of 15° C. A solution of 180 grams (3.0 mol) of isopropyl alcohol and 222 grams (1.5 mols) of 3,4-dihydrocoumarin was added dropwise with continuous stirring at such a rate so that the internal temperature did not exceed 15° C. During the addition period the acid fraction changed from colorless to yellow. Upon completion of the addition the ice cooling bath was removed and the reaction was stirred for an additional 9 hours. The reaction mixture was then allowed to stand at room temperature for a period of about 48 hours, following which the orange-red solution was slowly poured onto 1.5 kilogram of ice and water and then stirred for about 0.25 hour. The organic material was separated from the water, extracted with benzene, washed with a 10% sodium carbonate solution and dried with magnesium sulfate. The mixture was filtered and the filtrate subjected to removal of the benzene in vacuum on a rotary evaporator. The residue which remained was subjected to fractional distillation under reduced pressure through a 36 inch spinning band column to recover 5,7,-diisopropyl-3,4-dihydrocoumarin admixed with 8-isopropyl-2,4-dihydrocoumarin having a boiling point in the range of 147°–150° C. at 2 mm. pressure and a refractive index of $n_D^{20}$ 1.5272–1.5281. The desired product was subjected to infrared analysis which disclosed a characteristic unconjugated lactone carbonyl band at 5.63–5.73$\mu$ and isopropyl bands at 7.23 and 7.33$\mu$.

Example II

About 750 grams of polyphosphoric acid were added to an alkylation flask provided with heating and stirring means and was heated to about 75° C. while stirring constantly. A solution of 45 grams (0.75 mol) of isopropyl alcohol and 37 grams (0.25 mol) of 3,4-dihydrocoumarin was slowly added dropwise with constant stirring at such a rate so that the internal temperature did not exceed 80° C. During the addition of the solution the acid fraction changed from colorless to yellow. Upon completion of the addition of the solution which took about 1 hour the mixture was stirred and maintained at a temperature of about 80° C. for an additional hour. Following this stirring was discontinued, the reaction mixture allowed to return to room temperature and remain at this temperature for a period of 16 hours. At the end of this time the viscous orange solution was poured onto 1 liter of ice and water and stirred for about 0.25 hour. The organic material was separated from the water layer, extracted with ether, washed with a 10% sodium carbonate solution and dried with magnesium sulfate. The mixture was then filtered and the ether removed in vacuum on a rotary evaporator. The residue which remained was subjected to fractional distillation under reduced pressure through a 36″ spinning band column which allowed the fractions to be recovered in sharper cuts. The distillation resulted in obtaining 7.5 grams of unreacted starting material and 39.2 grams of mainly 6,8- and 5,7-diisopropyl-3,4-dihydrocoumarin with a minor amount of 6-isopropyl-3,4-dihydrocoumarin which had a boiling point in the range of 128°–141° C. and 2 mm. pressure and a refractive index of $n_D^{20}$ 1.5269–1.5281. The aforementioned alkylated dihydrocoumarin was subjected to infrared analysis which disclosed a characteristic unconjugated lactone carbonyl at 5.63–5.73$\mu$ and isopropyl bands at 7.23 and 7.33$\mu$.

*Example III*

A modern floral blend perfume backed up by a Woody-Ionone combination was made using the compound of this invention as an olfactory and fixative ingredient. The perfume contained the following ingredients:

| | Parts |
|---|---|
| 5,7,-diisopropyl-3,4-dihydrocoumarin | 5 |
| Vetivert acetate | 3 |
| Linalyl acetate | 3 |
| Hydroxycitronellal | 12 |
| Phenylethyl alcohol | 2 |
| Citronellol | 3 |
| Linalool | 2 |
| Methyl gamma-ionone | 10 |
| Benzyl alcohol | 5 |
| Guaiac acetate | 1 |
| a-Amylcinnamic aldehyde | 1 |

*Example IV*

A perfume having a Muguet character was made using the compound of this invention as an olfactory and fixative ingredient. The perfume contained the following ingredients:

| | Parts |
|---|---|
| 5,7-diisopropyl-3,4-dihydrocoumarin | 2 |
| Hydroxylcitronellal | 45 |
| p-Tertiary-$\alpha$-methyl dihydrocinnamic aldehyde | 5 |
| Citronellol | 15 |
| Oil Cananga | 5 |
| Linalool | 5 |
| Heliotropine | 2 |
| Aubepine | 3 |
| Isoeugenol 10% | 1 |
| Oil Cardamon 10% | 1 |
| Citronellyl formate | 6 |
| Ionone white | 3 |
| Tepyl acetate | 1 |
| Amyl phenyl acetate | 3 |
| Benzyl salicylate | 5 |
| Oil cade 10% | 1 |

I claim as my invention:
1. A perfume composition containing as an olfactory and fixative ingredient thereof 5,7-diisopropyl-3,4-dihydrocoumarin.
2. The perfume composition of claim 1 wherein the olfactory and fixative ingredient is present therein in an amount of from about 0.1 to 80 percent by weight of the perfume composition.
3. A perfume composition containing as an olfactory and fixture ingredient thereof a mixture of 5,7-diisopropyl-3,4-dihydrocoumarin and at least one compound selected from the group consisting of 6-isopropyl-3,4-dihydrocoumarin, 8-isopropyl-3,4-dihydrocoumarin and 6,8-diisopropyl-3,4-dihydrocoumarin.

References Cited by the Examiner

UNITED STATES PATENTS

| 2,542,965 | 2/1951 | Levesque | 260—343.2 |
| 2,918,412 | 12/1959 | Wood | 167—94 |
| 3,144,467 | 8/1964 | Houlihan | 260—343.2 |

FOREIGN PATENTS

| 718,325 | 11/1931 | France. |
| 939,923 | 10/1963 | Great Britain. |

OTHER REFERENCES

La Parfumerie Moderne, vol. 43, No. 22, pp. 84–90, January-February 1951.

JULIAN S. LEVITT, *Primary Examiner.*

VERA C. CLARK, *Assistant Examiner.*